United States Patent
Ferris et al.

(10) Patent No.: US 11,922,196 B2
(45) Date of Patent: Mar. 5, 2024

(54) CLOUD-BASED UTILIZATION OF SOFTWARE ENTITLEMENTS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1981 days.

(21) Appl. No.: 12/714,302

(22) Filed: Feb. 26, 2010

(65) Prior Publication Data
US 2011/0213691 A1    Sep. 1, 2011

(51) Int. Cl.
*G06Q 40/04* (2012.01)
*G06F 9/445* (2018.01)
*G06F 9/455* (2018.01)
*G06F 9/50* (2006.01)

(52) U.S. Cl.
CPC ...... *G06F 9/45533* (2013.01); *G06F 9/44505* (2013.01); *G06F 9/5072* (2013.01); *G06Q 40/04* (2013.01)

(58) Field of Classification Search
CPC ............. G06F 9/45533; G06F 9/44505; G06F 9/5072; G06Q 40/04
USPC ......................................................... 705/59
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,590,599 B2* | 9/2009 | Xia | G06F 8/62 705/52 |
| 7,596,620 B1 | 9/2009 | Colton et al. | |
| 2001/0039497 A1 | 11/2001 | Hubbard | |
| 2002/0032632 A1* | 3/2002 | Sernet | G06F 21/6254 705/37 |
| 2002/0069276 A1 | 6/2002 | Hino et al. | |
| 2002/0165819 A1 | 11/2002 | McKnight et al. | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Zeshan Qayyum
(74) *Attorney, Agent, or Firm* — Lowenstein Sandler LLP

(57) ABSTRACT

Embodiments relate to systems and methods for cloud-based brokerage exchange of software entitlements. A user can host on-premise software applications on physical hardware, and extend those applications to the cloud based on a set of entitlements developed in conjunction with the vendor(s) of the software. The set of entitlements enjoyed by the user and/or offered by the vendor(s) can be exposed to a bidding marketplace via a brokerage engine and associated bidding service, which can be hosted on a Web site. Other users, and/or other vendors interesting in consuming or supplying premise or loud-based images of the software, or related services, can be to obtain or supply those resources through the brokerage service. The license terms including usage rates, number of users or images, security constraints, and/or other terms of software delivery and usage can be recorded in a dynamically updated entitlement database.

19 Claims, 5 Drawing Sheets

(56) References Cited

U.S. PATENT DOCUMENTS

| | | |
|---|---|---|
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0044895 A1* | 3/2004 | Reasons et al. ............ 713/182 |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0273803 A1* | 12/2005 | Takagi et al. ............... 725/23 |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2008/0243642 A1* | 10/2008 | Ramer ............... G06Q 30/08 705/37 |
| 2009/0012885 A1 | 1/2009 | Cahn |
| 2009/0019492 A1* | 1/2009 | Grasset ............ H04N 21/2347 348/E7.071 |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1* | 11/2009 | Nickolov ............ G06Q 30/04 718/1 |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2009/0328227 A1* | 12/2009 | Cook ................... G06F 21/121 726/26 |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0228631 A1* | 9/2010 | Zhang et al. ............ 705/14.66 |
| 2010/0299366 A1 | 11/2010 | Stienhans et al. |
| 2011/0016214 A1 | 1/2011 | Jackson |
| 2011/0047540 A1* | 2/2011 | Williams et al. ............ 717/178 |
| 2011/0131335 A1 | 6/2011 | Spaltro et al. |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

(56) References Cited

OTHER PUBLICATIONS

Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
"RBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vender Products in Cloud Networks", U.S. Appl. No. 12/790,039, filed May 28, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

CLOUD-BASED UTILIZATION OF SOFTWARE ENTITLEMENTS

FIELD

The present teachings relate to systems and methods for cloud-based brokerage exchange of software entitlements, and more particularly to platforms and techniques for hosting and organizing software entitlements in a brokerage service for exposure to a bid marketplace, so that diverse users and vendors can bid to supply and consume sets of premise-based and cloud-based application images.

BACKGROUND OF RELATED ART

The advent of cloud-based computing architectures has opened new possibilities for the rapid and scalable deployment of virtual Web stores, media outlets, and other online sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Environments can be deployed in which the user can deploy a set of premise-based applications on servers, clients and other machines in the user's base network, but also wish to extend those applications to be available for usage via the cloud. In a mixed set of premise-based and cloud-based group of application images, it is possible to maintain a set of entitlements to the usage of the software via either source. In cases where a set of software entitlements may be established for a mixed-use environment, it may be desirable to expose the set of license terms and/or other entitlements to the software, and the provisioning of that software, to a brokerage service or site through which other users or vendors can bid to contribute or consume those applications and related resources, on a marketplace basis.

DESCRIPTION OF EMBODIMENTS

Figure 1:
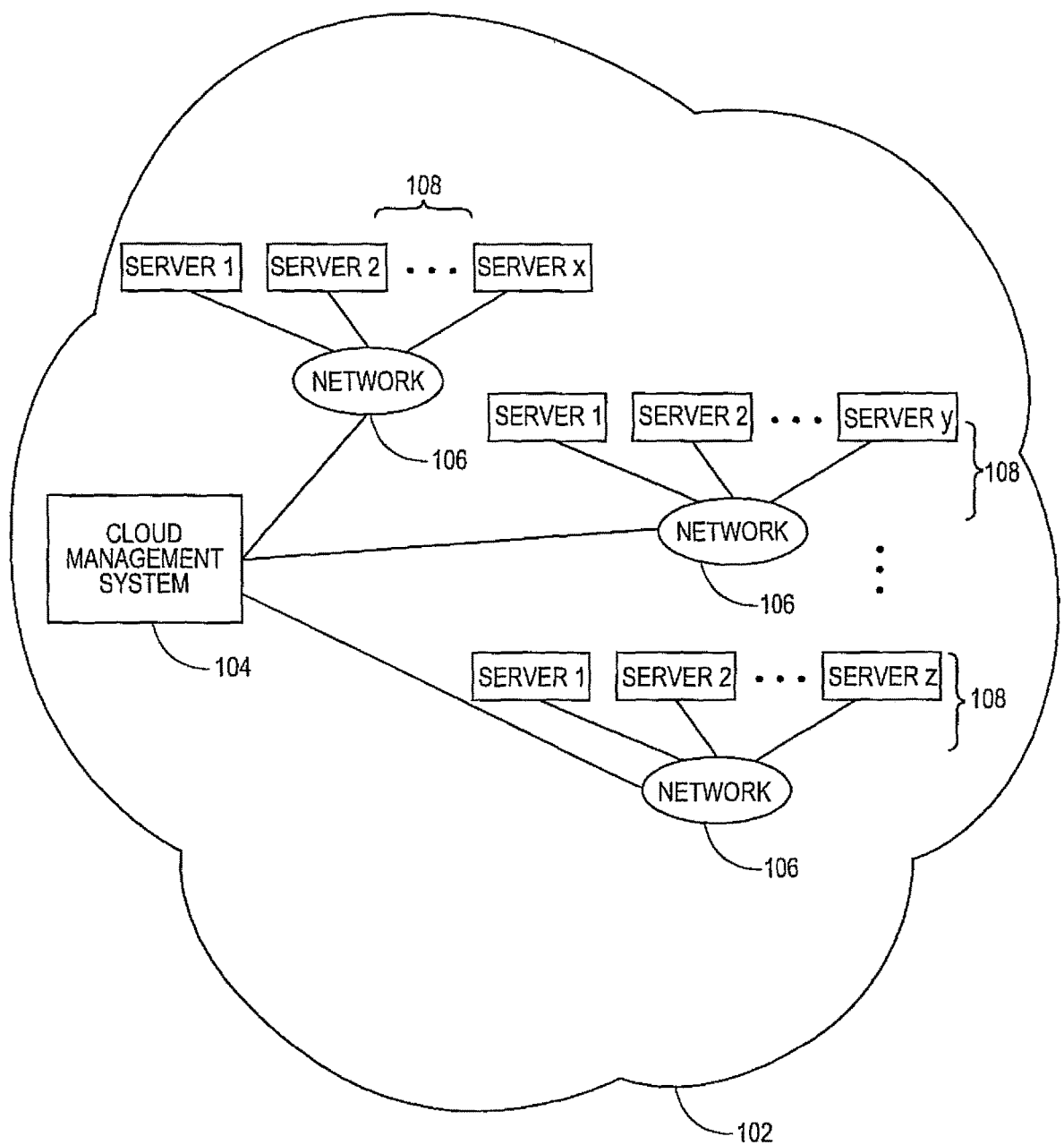
FIG. 1 illustrates an overall cloud system architecture in which various embodiments of the present teachings can be practiced.

Embodiments relate to systems and methods for cloud-based brokerage exchange of software entitlements. More particularly, embodiments relate to platforms and techniques in which the set of licensing, usage, and/or other entitlements to a mixed set of premise-based and cloud-based software images can be exposed to a bidding marketplace for potential exchange, via a brokerage engine and/or related service. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
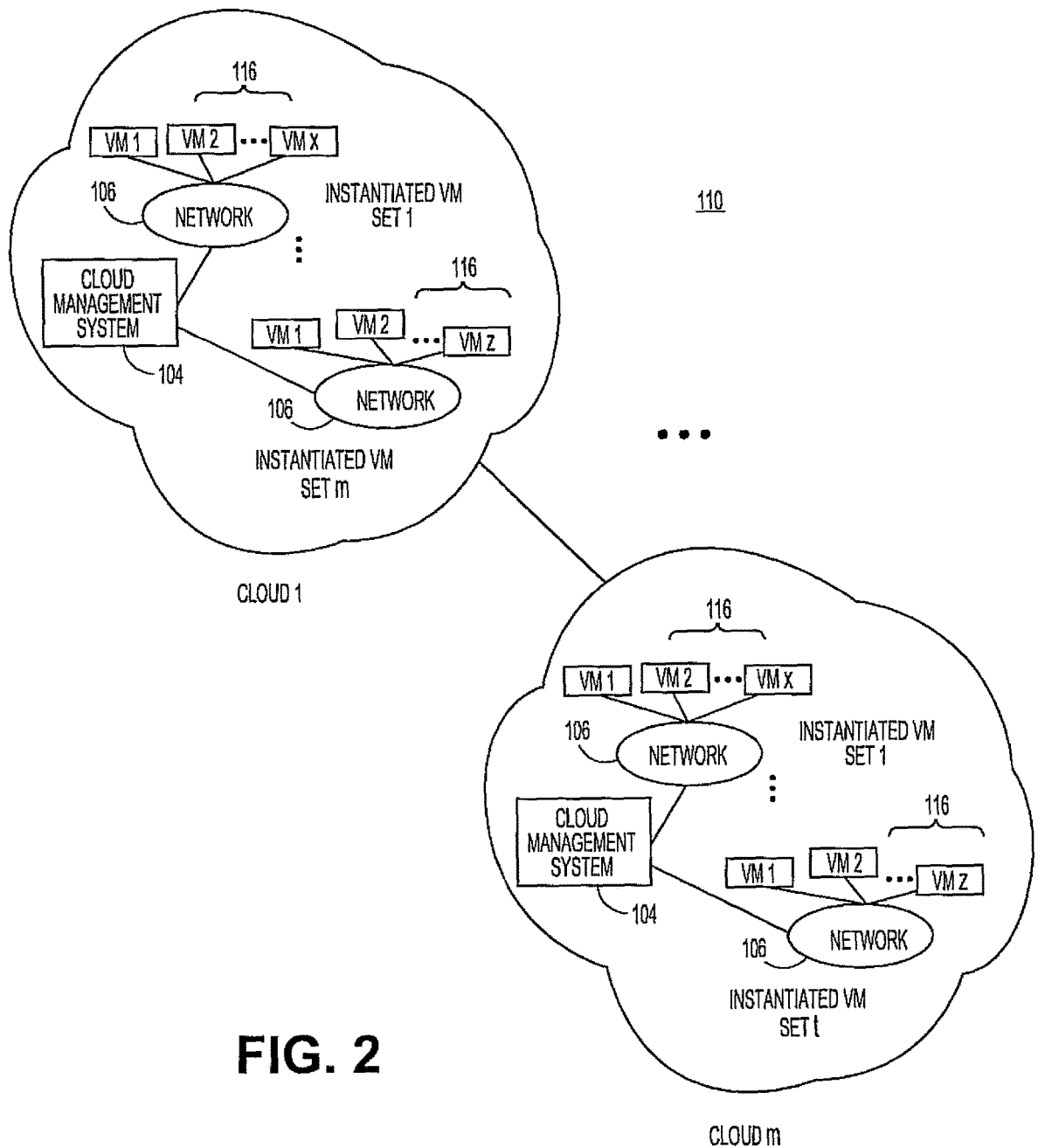
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 114 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
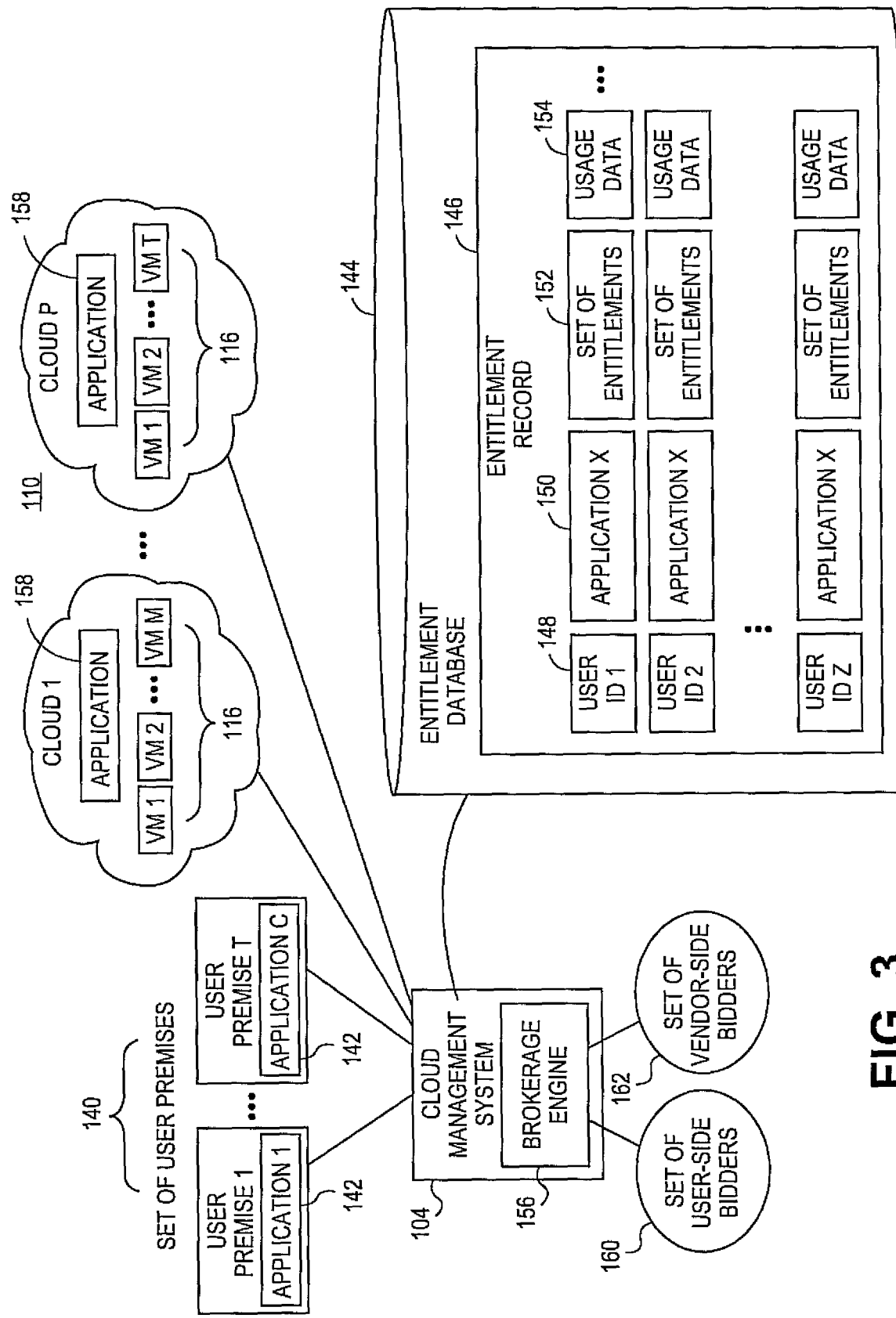
FIG. 3 illustrates a network configuration in which a cloud management system can perform various software brokerage functions including extensions of premise-based software to the cloud for bidding or brokerage activity, according to various embodiments.

FIG. 3 illustrates an illustrative network in which systems and methods for cloud-based brokerage exchange of software entitlements can be implemented, according to aspects of the present teachings. In embodiments as shown, one or more users can maintain a set of user premises 140, including for instance networks, servers, clients, and/or other machines, communications facilities, and other resources. The user or users of set of user premises 140 can likewise maintain a set of premise-based applications 142, such as applications, operating systems, and/or other software received via compact disc or other optical media, and/or downloaded directly to set of user premises 140 over the Internet. Set of user premises 140 can communicate with a cloud management system 104, which in turn can host brokerage engine 156 that maintains or accesses an entitlement database 144. In aspects, one or more of the users of the set of user premises 140 can choose to instantiate a set of cloud-based application images 158 of set of premise-based applications 142 on one or more set of virtual machines 116 maintained in one or more cloud environments. The entitlement database 144 can store an entitlement record 146 reflecting attributes of a user's complement of premise-based and cloud-based application images, and licenses, terms, subscription rates, and/or other conditions of usage of those software resources. Entitlement record 146 can comprise, for instance, fields including a user ID field 148, an application ID field 150, a field or entry for a set of entitlements 152 to each enumerated or identified piece of software, and a set of usage data 154 indicating a usage history of the subject software images, either on-premise and/or in the cloud.

According to aspects, brokerage engine 156 can expose set of entitlements 152 and/or other data to a bidding marketplace or environment, in which producers and consumers of software images can exchange or transact the set of entitlements 152 to that software on a market basis. In aspects as shown, a set of user-side bidders 160 and a set of vendor-side bidders 162 can communicate with brokerage engine 156 to review, bid on, and receive software images and their associated entitlements. For example, a user in set of user-side bidders 160 can determine that their organization hosts 100 images of Application X on their premises, but would like to obtain an additional 200 images of Application X from the cloud. In this case, that user can bid to obtain a license or subscription to 200 images of Application X, for instance for one month at a subscription rate of one hundred dollars per image per month. In such a scenario, brokerage engine 156 can examine entitlement database 144 and determine that a certain registered user has rights or entitlement to 500 images of Application X, and would be willing to transact or exchange that set 200 images from that set of entitlements to the requesting bidder. Upon agreement on those terms, brokerage engine 156 can exchange or transfer the entitlements to 200 images of Application X to the requesting bidder, and record those updated usage rights to entitlement record 146. For further instance, a vendor in set of vendor-side bidders 162 can submit a bid to supply 100 images of Application Y to an interested user on the cloud or on-premise, based on certain usage caps for a subscription price of fifty dollars per image per month. Other bid terms, variables, and conditions can be used. In embodiments, in general, brokerage engine 156 can mediate the exchange of premise and/or cloud-based software images and their associated entitlements between set of user-side bidders 160 and set of vendor-side bidders 162, to facilitate an open flow of software usage entitlements in a mixed premise/cloud environment.

Figure 4:
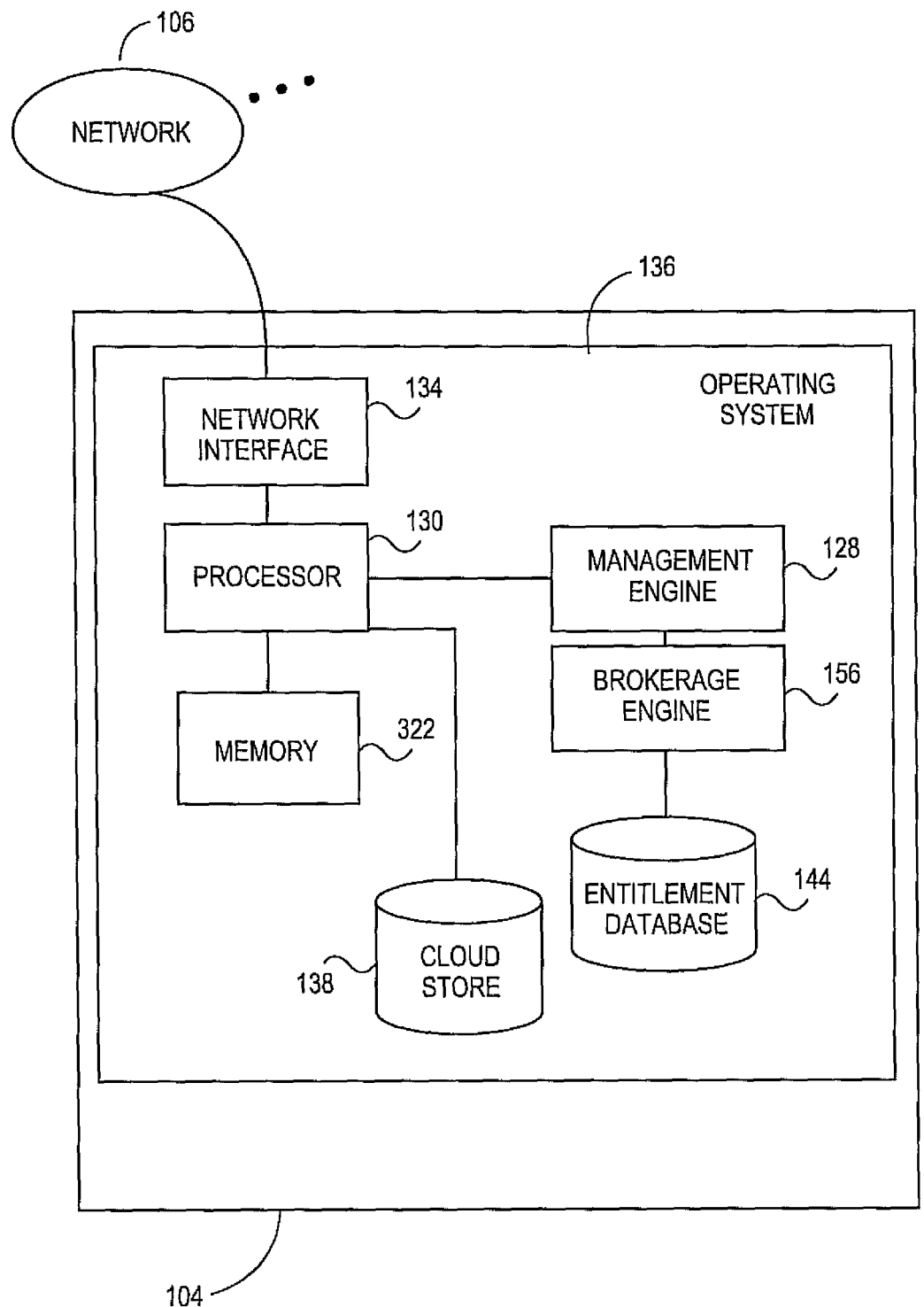
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with set of instantiated virtual machines 116 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with could store 138 and management engine 128, to execute control logic and control the operation of virtual machines and other resources in cloud 102. Other configurations of cloud management system 104, associated network connections, and other hardware and software resources are possible.

Figure 5:
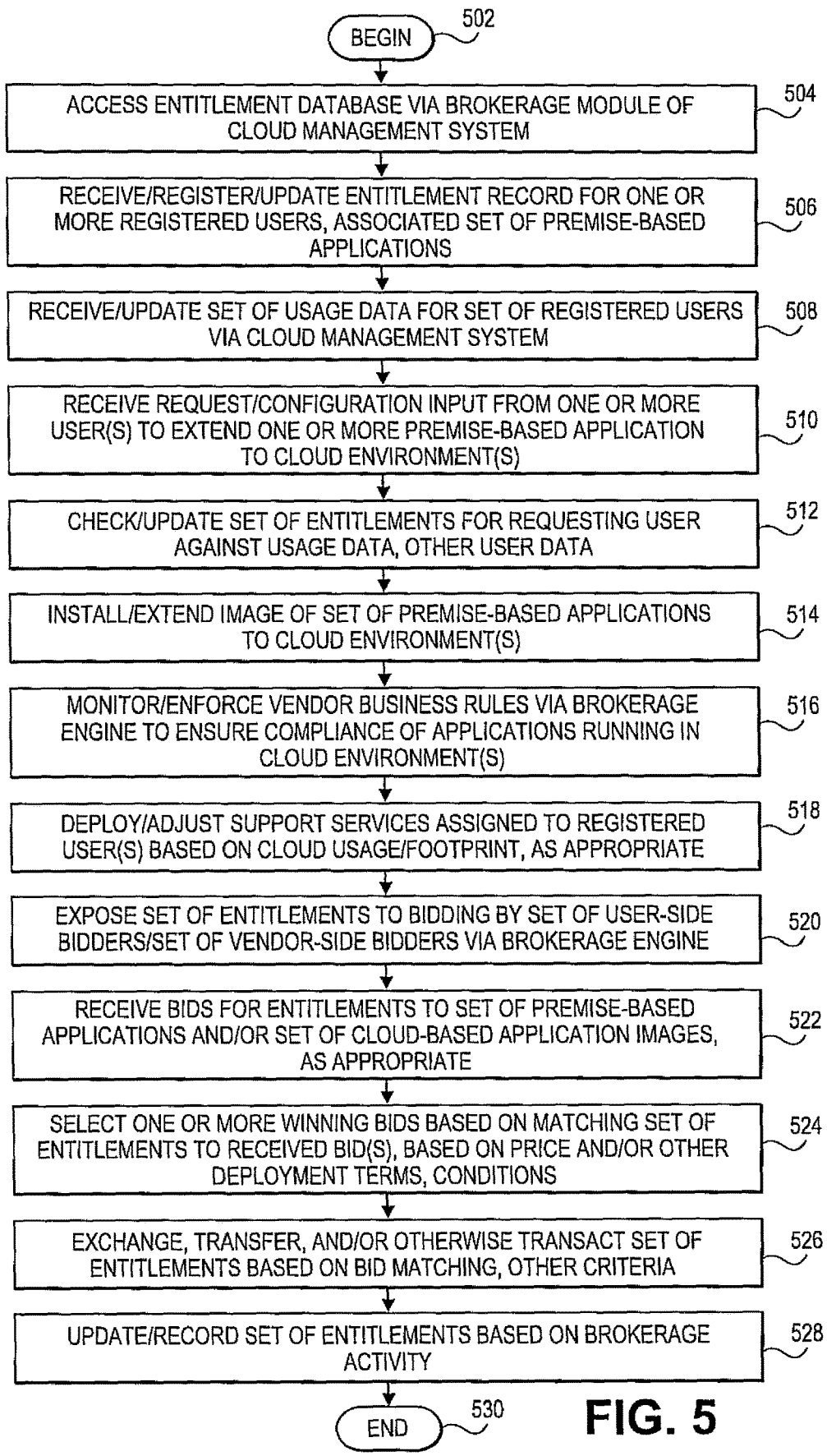
FIG. 5 illustrates a flowchart for overall software brokerage processing in a cloud computing environment, according to various embodiments.

FIG. 5 illustrates a flowchart of overall software deployment and brokerage processing, according to various embodiments of the present teachings. In 502, processing can begin. In 504, entitlement database 144 can be accessed via brokerage engine 156 of cloud management system 104, and/or other logic, engines, or modules. In 506, entitlement record 146 for one or more registered user(s) can received, registered, and/or updated in entitlement database 144, along with an identification of one or more associated set of premise-based applications 142 for those users. In aspects, set of premise-based applications 142 can be or include locally installed applications received via download, optical disk, and/or other media, for example on one or more machines on a local area network, and/or other network. In 508, brokerage engine 156 and/or other logic can access, receive, and/or update set of usage data 154 via cloud management system 104 for the one or more users registered to entitlement database 144. Set of usage data 154 can contain values, fields, or other data such as the type, number of images, installation location, usage time, security features, and/or other attributes of the user's use of set of premise-based applications 142 and/or set of cloud-based application images 158.

In 510, brokerage engine 156 and/or other logic can receive a request and/or configuration input from the one or more registered user(s) to extend or configure premise-based application in set of premise-based applications 142 to the cloud environment 110, as a cloud-based application image. In 512, brokerage engine 156 can check and/or update set of entitlements 152 and related data for the requesting user(s) against the set of usage data 154, and/or other user data. In 514, brokerage engine 156 and/or other logic can install, instantiate, and/or extend one or more of the set of premise-based applications 142 to cloud environment 110 based on the user request and/or other factors, to establish set of cloud-based application images 158 for those applications. In aspects, a user can thereby deploy a mixed set of premise-based and cloud-based versions of desired applications and/or other software, within a consistent usage framework.

In 516, brokerage engine 156 can monitor and/or enforce business rules and/or other logic to manage and ensure compliance of the usage behavior and parameters of the set of cloud-based application images 158 for the set of registered users. For example, limitations or specifications for the number of application images, usage time, processor throughput, and/or other usage parameters can be monitored for compliance, adjustment, and/or updating. In embodiments, brokerage engine 156 can also or instead manage the usage behavior of users in connection with set of premise-based applications 142. In 518, cloud management system 104, brokerage engine 156, and/or other logic or network resources can deploy and/or adjust the support services assigned to the registered user(s), based on the user or user's usage of set of cloud-based application images 158, set of premise-based applications 142, set of usage data 154, and/or other data. For instance, a user may be allocated a greater amount or variety of technical support that scales with increasing application usage, on the cloud, at the promise, or both.

In 520, brokerage engine 156 and/or other logic can expose set of entitlements 152 to bidding by a set of user-side bidders 160 and/or set of vendor-side bidders 162, for example, via a Web site-based brokerage service. In 522, brokerage engine 156 and/or other logic can receive bids from set of user-side bidders 160 and/or set of vendor-side bidders 162 for set of entitlements 152 to set of premise-based applications 142 and/or set of cloud-based application images 158, as appropriate. As noted, set of entitlements 152 can include one or more licenses to those software instances, terms of use for that software, and/or other parameters. In 524, brokerage engine 156 and/or other logic can select one or more winning or accepted bids based on matching the set of received bids to the set of entitlements 152, based on price and/or other deployment or usage terms or conditions. In 526, brokerage engine 156 and/or other logic can exchange, transfer, initiate, and/or otherwise transact the establishment or transfer of set of entitlements 152 and/or components thereof based on bid matching, and/or other criteria. For example, one user can assume the license to a premise-based or cloud-based software application from another user, or one vendor can take on the support services for a set of cloud-based application images 158 originally from another vendor. Other transactions are possible.

In 528, brokerage engine 156 and/or other logic can update/record set of entitlements 152 to entitlement database 144 based on the brokerage activity. In 530, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system and 104 associated logic can be distributed among multiple servers or systems. Similarly, while embodiments have been described in which one group of servers within a set of resource servers 108 can provide one component to build a requested set of virtual machines, in embodiments, one group of resource servers can deliver multiple components to populate the requested set of virtual machines 116. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
receiving, by a hardware processor of a cloud management system, usage data of a set of executable software applications that comprises an executable software application running on an on-premise resource, wherein the cloud management system manages a cloud system that comprises the hardware processor and the hardware processor is remote from the on-premise resource;
receiving, by the hardware processor of the cloud management system, information regarding software application entitlements covering use of the set of executable software applications;
checking, by the hardware processor of the cloud management system, the software application entitlements in view of the usage data of the set of executable software applications, wherein the checking comprises a comparison between the information and the usage data;
responsive to the checking, instantiating, by the hardware processor of the cloud management system, a virtual machine comprising an executable software application on a resource server of the cloud computing system and updating the set of executable software applications to include usage of the executable software application instantiated on the resource server of the cloud computing system, wherein the updated set of executable software applications comprises a mixed set of premise-based and cloud-based executable software applications and is in compliance with the software application entitlements;
transferring, by the hardware processor of the cloud management system, at least one of the software application entitlements that covers use of the executable software application on the resource server to a user machine; and
configuring, by the hardware processor of the cloud management system, the cloud computing system and the virtual machine comprising the executable software application to be available to the user machine.

2. The method of claim 1 further comprising, exposing information regarding the at least one of the software application entitlements to the user machine, wherein the exposing comprises using a web site to provide access to information, and wherein the information comprises a number of users, a number of images, an upgrade entitlement, a maximum run time, or a support service.

3. The method of claim 1, further comprising:
receiving, by the hardware processor of the cloud management system, a plurality of bids regarding an exchange of the software application entitlement covering use of the executable software application on the resource server of the cloud computing system; and
selecting one of the plurality of bids in view of a highest subscription price.

4. The method of claim 1, further comprising:
receiving a plurality of bids regarding exchange of the software application entitlement covering use of the executable software application on the resource server of the cloud computing system; and
selecting one of the plurality of bids in view of a closest match to a usage rule.

5. The method of claim 1, further comprising: exposing the information regarding the at least one of the software application entitlements to a plurality of user machines, and wherein the exposing comprises providing access to the information regarding the software application entitlements via an online brokerage service.

6. The method of claim 1, further comprising:
registering a set of premise-based applications installed on at least one set of user machines;
instantiating a set of virtual machines in at least one cloud computing environment; and
installing a set of cloud-based applications on the set of virtual machines, wherein the software application entitlements comprise entitlements covering use of the set of premise-based applications and the set of cloud-based applications.

7. The method of claim 1 further comprising, building the virtual machine to comprise the executable software application, wherein the building comprises installing the executable software application onto the virtual machine.

8. A system comprising:
a memory comprising instructions; and
a hardware processor of a cloud management system operatively coupled to the memory, the hardware processor to execute the instructions to:
receive usage data of a set of executable software applications that comprises an executable software application running on an on-premise resource, wherein the cloud management computing system manages a cloud computing system that comprises the hardware processor and the hardware processor is remote from the on-premise resource;
receive information regarding software application entitlements covering use of the set of executable software applications;
check the software application entitlements in view of the usage data of the set of executable software applications, wherein the checking comprises a comparison between the information and the usage data;
responsive to the check, instantiating a virtual machine comprising an executable software application on a resource server of the cloud computing system and updating the set of executable software applications to include usage of the executable software application instantiated on the resource server of the cloud computing system, wherein the updated set of executable software applications comprises a mixed set of premise-based and cloud-based executable software applications and is in compliance with the software application entitlements;

transfer at least one of the software application entitlements covering use of the executable software application on the resource server to a user machine; and configure the cloud computing system and the virtual machine comprising the executable software application to be available to the user machine.

9. The system of claim 8, wherein the hardware processor is further to expose the information regarding the at least one of the software application entitlements to the user machine via a web site that provides access to the information, and wherein the information comprises a number of users, a number of images, an upgrade entitlement, a maximum run time, or a support service.

10. The system of claim 8, wherein the hardware processor is further to:

receive a plurality of bids regarding exchange of the software application entitlement covering use of the executable software application on the resource server of the cloud computing system; and select one of the plurality of bids in view of a highest subscription price.

11. The system of claim 8, wherein the hardware processor is further to:

receive a plurality of bids regarding exchange of the software application entitlement covering use of the executable software application on the resource server of the cloud computing system; and select one of the plurality of bids in view of a closest match to a usage rule.

12. The system of claim 8, wherein the hardware processor is further to: expose the information regarding the at least one of the software application entitlements to the user machine via an online brokerage service.

13. The system of claim 8, wherein the hardware processor is further to:

register a set of premise-based applications installed on at least one set of user machines;

instantiate a set of virtual machines in at least one cloud computing environment; and install a set of cloud-based applications on the set of virtual machines, wherein the software application entitlements comprise entitlement covering use of the set of premise-based application and the set of cloud-based applications.

14. The system of claim 8 wherein the hardware processor is further to, build the virtual machine to comprise the executable software application by installing the executable software application onto the virtual machine.

15. A non-transitory computer-readable medium having instructions encoded thereon which, when executed by a hardware processor of a cloud management system, cause the hardware processor to:

receive usage data of a set of executable software applications that comprises an executable software application running on an on-premise resource, wherein the cloud management system manages a cloud computing system that comprises the hardware processor and the hardware processor is remote from the on-premise resource;

receive information regarding software application entitlements covering use of the set of executable software applications;

check the software application entitlements in view of the usage data of the set of executable software applications, wherein the checking comprises a comparison between the information and the usage data;

responsive to the check, instantiating a virtual machine comprising an executable software application on a resource server of the cloud computing system and updating the set of executable software applications to include usage of the executable software application instantiated on the resource server of the cloud computing system, wherein the updated set of executable software applications comprises a mixed set of premise-based and cloud-based executable software applications and is in compliance with the software application entitlements;

transfer, by the hardware processor, at least one of the software application entitlements that cover use of the executable software application on the resource server to a user machine; and configure the cloud computing system and the virtual machine comprising the executable software application to be available to the user machine.

16. The non-transitory computer-readable medium of claim 15, wherein the hardware processor is further to:

receive a plurality of bids regarding an exchange of the software application entitlement covering use of the executable software application on the resource server of the cloud computing system; and select one of the plurality of bids in view of a highest subscription price.

17. The non-transitory computer-readable medium of claim 15, wherein the hardware processor is further to:

receive a plurality of bids regarding an exchange of the software application entitlement covering use of the executable software application on the resource server of the cloud computing system; and select one of the plurality of bids is in view of a closest match to a usage rule.

18. The non-transitory computer-readable medium of claim 15, wherein the hardware processor is further to expose the information regarding the at least one of the software application entitlement to the user machine via a web site that provides access to the information.

19. The non-transitory computer-readable medium of claim 15, wherein the instructions further comprise, building the virtual machine to comprise the executable software application, wherein the building comprises installing the executable software application onto the virtual machine.

* * * * *